Feb. 7, 1933.  C. H. TRUE  1,896,261

CONICAL JOINT

Filed July 3, 1930

INVENTOR
Charles H. True.
BY O. V. Thiele
ATTORNEY

Patented Feb. 7, 1933

1,896,261

UNITED STATES PATENT OFFICE

CHARLES H. TRUE, OF CHICAGO, ILLINOIS, ASSIGNOR TO THE SUPERHEATER COMPANY, OF NEW YORK, N. Y.

CONICAL JOINT

Application filed July 3, 1930. Serial No. 465,617.

My invention relates to joints and more particularly to joints adapted for connecting tubular units to headers and I aim to provide a joint for this purpose of high efficiency and moderate cost.

A header joint in common use employs a spherical ball on the tube end bearing against a conical seat. While this is a very efficient joint it requires considerable skill to make the ball of a true spherical shape, so that the labor cost per unit is often high.

In accordance with my invention, I avoid the difficulty mentioned while obtaining an efficient joint by making the end of the tube with an obtuse angle forming a circular ridge or sharp shoulder adapted to bear against a flaring seat on the header to form a tight joint. The end of the tube may be forced against its seat with sufficient pressure so that the ridge on the tube end will either cut into the seat or will crush to some extent, or both, and thereby insure a tight joint, even if the ridge of the tube is not exactly perpendicular to the axis of its seat.

The novel features of my invention will be pointed out in the appended claims. In order, however, that my invention may be clearly understood, I will now describe in detail in connection with the accompanying drawing, a joint between a tubular superheater unit and a header forming an illustrative embodiment of my invention. In the drawing, Fig. 1 is a side view partly in section and partly in elevation of a fragment of a header having two tubular units secured thereto by joints in accordance with my invention.

Figures 1, 2, 3:
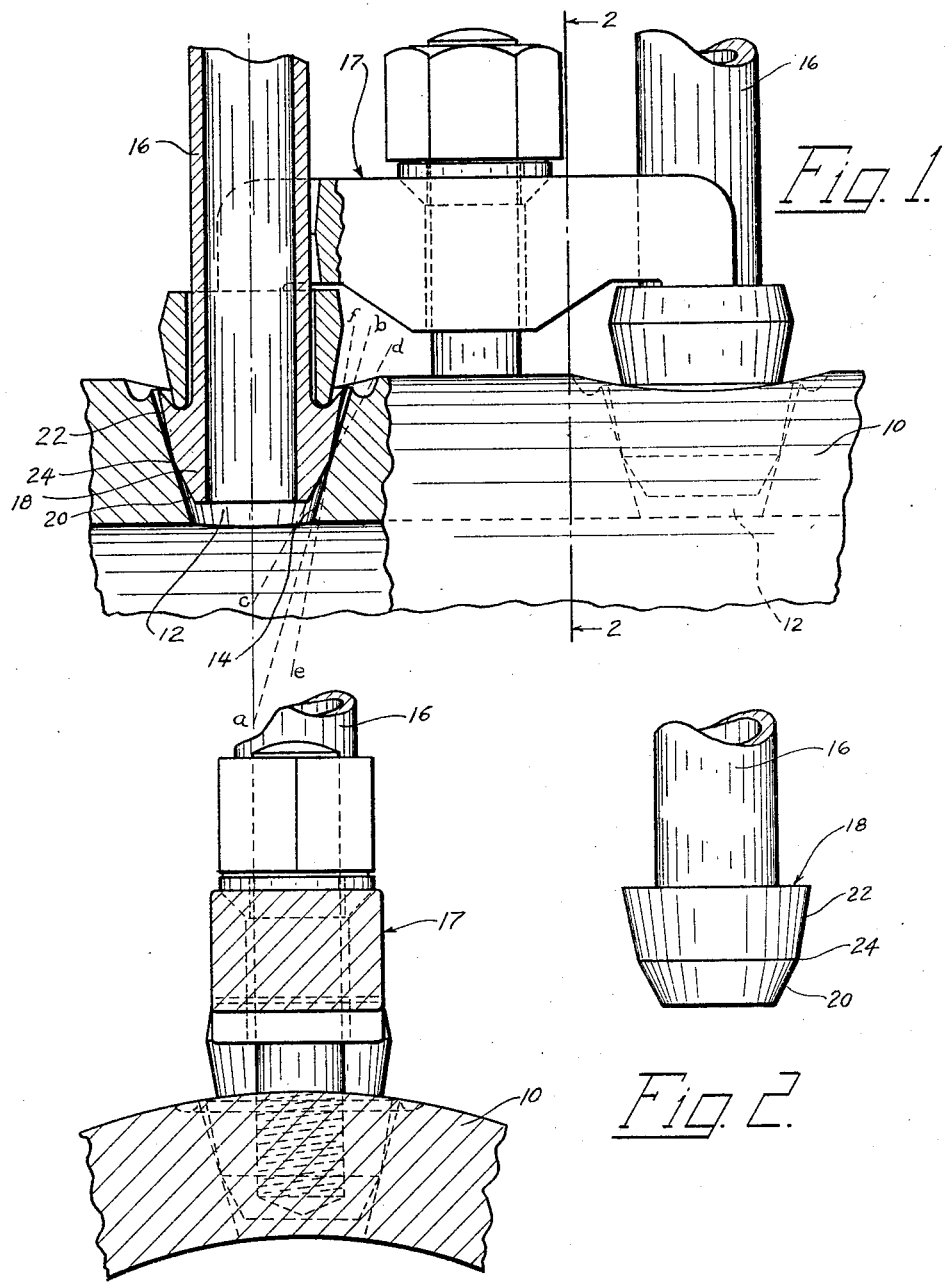
Fig. 2 is a section on the line 2—2 of Fig. 1.
Fig. 3 is an elevation of the end of one of the units shown in Figs. 1 and 2.

Referring to the drawing more in detail, 10 is a header or manifold illustrated as having a cylindrical form, but which may be of any convenient form without departing from the invention. In the wall of the header 10 are a number of similar apertures, one of which is indicated at 12. Each of the apertures 12 flares outwardly to form a conical seat 14 which is adapted to cooperate with the ends of the tubular units 16, 16. By forcing the units 16 against the seats 14 by suitable means such as 17 which are in common use, a fluid tight joint may be made between the units 16 and header 10.

In the arrangement illustrated, the end of each element such as 16 has an enlarged head 18 adapted to be inserted in an aperture 12 and for this purpose is so formed that its outer surface tapers inwardly, somewhat complementally to the outward flare of the seat 14. However, whereas the seat 14 is shown as having a constant taper or inclination throughout its length, the particular embodiment of the invention illustrated is so formed that the outer surface of the head 18 has two different tapers or slopes. The portion 20 of the head 18 nearer its free end has a relatively flatter slope than the portion 22 of the head 18 further removed from the free end, so that a ridge 24 is formed on the outer surface of head 18 at the intersection of the two conical surfaces 20 and 22. Ridge 24 surrounds the head 18 forming a ring lying in a plane substantially at right angles to the axis of the surface 14 and adapted to bear against the seat 14 in the header. In order to provide for the desired contact between the ridge or shoulder 24 and the seating surface 14, the flare of the conical surface 14 should be less than that of the surface 20. The surface 22 is shown as having a steeper slope or less flare than that of the surface 14. In other words, when the parts are assembled as shown, the surfaces 14, 20 and 22 are coaxial and the angle made between the axis X—Y of unit 16 and an element of the cone 20 should be greater than the angle between the axis and an element of the cone 14, and the angle between the axis and an element of cone 14 should be greater than the angle between the axis and an element of the cone 22. These relationships are illustrated in the drawing by straight lines $ab$, $cd$, and $ef$. The line $ab$ is an extension of an element of the surface of the seat 14, whereas the line $cd$ is an extension of an element of the surface 20, and the line $ef$ is an extension of an element of the surface 22. It will be observed that the angle between line *ab* and the axis of the tubular element 16 is less than that formed by the line *cd* but greater than that formed by the line *of* with such axis.

However, it will be understood that the slope of the surface 22 is largely immaterial so long as it permits the shoulder 24 to carry the entire pressure between the unit 16 and seat 14. Moreover, while the conical surfaces are considered the most convenient to make, it is within my invention to make one or more of surfaces 14, 20 and 22 concave or convex. In such case the slope or flare is measured between the lines at the ends of each surface.

In case the plane of ridge 24 of unit 16 is not at right angles to the axis of its aperture 12, the ridge 24 theoretically would not make continuous contact with seat 14. However, the parts are forced together with sufficient pressure so that the elasticity of the metal together with some cutting and crushing action permits the tube end and seat to make a tight joint when the unit is out of axial position by a substantial amount. It will be understood that usually the axes of the tubular units coincide with those of the apertures in the header, but that my invention may be applied in arrangements having angles between the two sets of axes so long as the planes of the ridges on the tube units are nearly enough perpendicular to the axes of the apertures so that the yielding of the metal permits a tight joint.

It will be seen that a joint in accordance with my invention may be made readily by turning or grinding three flaring surfaces and also that a joint which has been made and then broken can be easily restored to condition for use by taking light cuts off the flaring surfaces on the tube ends and seat.

What I claim is:

1. The combination with a substantially conical flaring seat, of a tube having a head adapted to seat thereagainst and having a flaring portion whose flare is greater than that of said seat but is so that an extension of the outer border of its axial section intersects the axis of said tube at an acute angle, and a second flaring portion whose flare is less than that of said seat, the said portions intersecting to form a ridge adapted to bear against said seat to form a fluid-tight joint.

2. The combination in a closure of two members adapted to contact with each other along a line to form a joint, one of said members having a substantially conical surface throughout and the other having two sloping surfaces forming an obtuse angle at said line of contact.

CHARLES H. TRUE.